(12) United States Patent
Gatuslao

(10) Patent No.: US 8,156,670 B2
(45) Date of Patent: Apr. 17, 2012

(54) AUTOMATED ROTATING BILL BOARD

(75) Inventor: Glenn R. Gatuslao, Makati (PH)

(73) Assignee: Glenn R. Gatuslao, Makati (PH)

( * ) Notice: Subject to any disclaimer, the term of this patent is extended or adjusted under 35 U.S.C. 154(b) by 0 days.

(21) Appl. No.: 13/133,645

(22) PCT Filed: Aug. 12, 2009

(86) PCT No.: PCT/PH2009/000012
§ 371 (c)(1), (2), (4) Date: Jun. 8, 2011

(87) PCT Pub. No.: WO2010/068125
PCT Pub. Date: Jun. 17, 2010

(65) Prior Publication Data
US 2011/0239500 A1    Oct. 6, 2011

(30) Foreign Application Priority Data

Dec. 8, 2008    (PH) .................. 2-2008-000534 U

(51) Int. Cl.
*G09F 19/00* (2006.01)
(52) U.S. Cl. .......... 40/473; 40/430; 40/431; 40/432
(58) Field of Classification Search ........ 40/430, 40/731, 733, 473, 474
See application file for complete search history.

(56) References Cited

U.S. PATENT DOCUMENTS

| | | | | |
|---|---|---|---|---|
| 3,320,691 A | * | 5/1967 | Harmon | 40/473 |
| 3,947,985 A | * | 4/1976 | Skrzypczak | 40/473 |
| 6,571,495 B1 | * | 6/2003 | Margaronis | 40/473 |
| 2002/0152656 A1 | * | 10/2002 | Huang | 40/431 |
| 2006/0137231 A1 | * | 6/2006 | Phillips | 40/430 |

FOREIGN PATENT DOCUMENTS

| | | |
|---|---|---|
| KR | 2002-0078163 A | 10/2002 |
| KR | 10-0522970 B1 | 10/2005 |
| KR | 10-2006-0012352 A | 2/2006 |

OTHER PUBLICATIONS

International Search Report mailed Mar. 22, 2010, for PCT Application No. PCT/PH2009/000012, filed Aug. 12, 2009, two pages.

* cited by examiner

*Primary Examiner* — Casandra Davis
(74) *Attorney, Agent, or Firm* — Morrison & Foerster LLP

(57) ABSTRACT

This utility model relates in general to Advertising medium but more particularly to an Automated Rotating Billboards structures. The billboard structure comprising a billboard frame having lighting facility consisting of plurality of lighting fixtures secured thereto and being provided with a covering for securing advertisement thereon, the frame being supported by an upstanding post fixedly attached on its bottom portion thereof. The upstanding post comprising of a lower stationary post member and upper rotating post member. The upper post member is being adapted to rotate using an electric motor wherein the billboard is connected. With rotating billboard, it can be seen from all angles thus more efficient and convenient to use.

1 Claim, 2 Drawing Sheets

AUTOMATED ROTATING BILL BOARD

This application is a U.S. National Stage Application under 35 U.S.C. §371 of International Patent Application No. PCT/PH2009/000012, filed Aug. 12, 2009, entitled "Automated Rotating Bill Board," which claims the benefit to Philippines Application No. 2-2008-000534, filed Dec. 8, 2008, entitled "Automated Rotating Billboard," each of which is incorporated by reference in their entirety for all intended purposes.

FIELD OF THE UTILITY MODEL

This utility model relates in general to Advertising medium but more particularly to an Automated Rotating Billboards structures.

BACKGROUND OF THE UTILITY MODEL

Heretofore, existing billboards requires at least 100 square meters of lot area to mount a 40×60 steel frame structure, the problem in this kind of billboards is that it is too expensive to construct and there's a need for a bigger space.

It is therefore the main object of the present utility model to provide a billboard that requires lesser space and can capture a niche in the market that can only be possible when it is strategically located that is, where contemporary outdoor billboards are not or cannot be positioned.

Another problem with the existing billboards is that only two directions are visible to the public for viewing, with the present automated billboard, advertisers are enable to display their ad materials in different angles visible from all directions preferred at a given time. This will attract more advertisers as it offers a unique and wider scope in terms of capturing the attention of prospective clients.

Furthermore the present utility model is light and easy to transport to desired location.

Still another object of the utility model is to provide Automated Rotating Billboards that is easy to manufacture using locally available material and technology These and other object of the present utility model will be apparent upon reading the following description taken in conjunction with the accompanying drawing.

DETAILED DESCRIPTION

Figure 1:
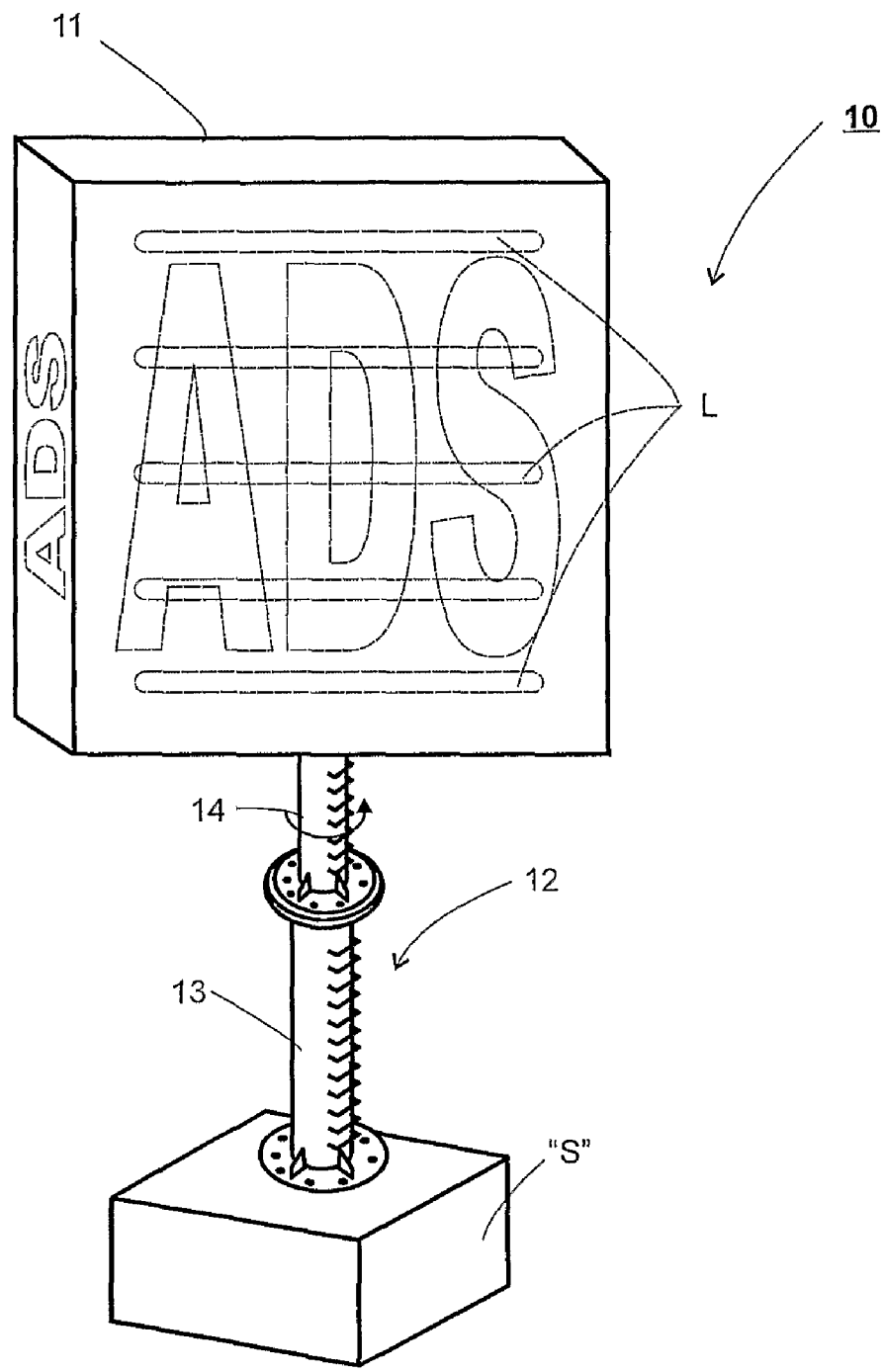
FIG. 1 is a perspective view of an Automated Rotating Billboard with longitudinal rectangular billboard frame.
Figure 2:
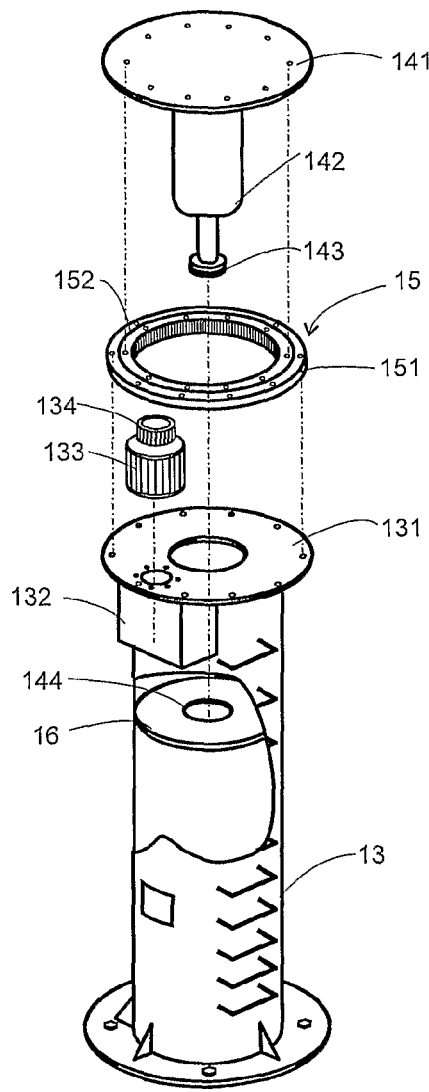
FIG. 2 is a partial exploded perspective view of the moving mechanism thereof.
Figure 3:
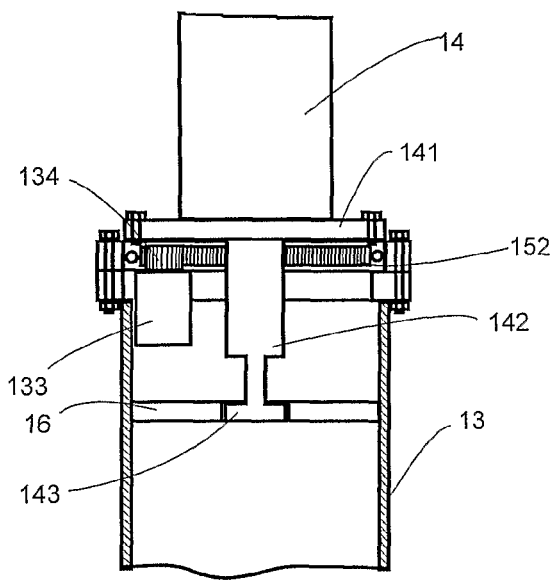
FIG. 3 is a partial sectional view of the interconnection of the upper and lower post members.

Referring now to the several views of the drawings, wherein like reference numerals designate same parts throughout, there is shown a utility model for Automated Rotating Billboard generally designated as 10.

Said automated rotating billboard 10 comprises a billboard frame 11 having lighting facility "L" consisting of plurality of lighting fixtures secured thereto and being provided with a covering for securing advertisement thereon. Said billboard frame 11 preferably made of steel structure frame, the size of the frame vary in height and width. The height is proportionate to its body and base to maintain its sturdiness from top to bottom. Said frame 11 being supported by an upstanding post 12 fixedly attached on its bottom portion thereof. The improvement wherein said upstanding post 12 comprising of a lower stationary post member 13 and upper rotating post member 14. Said lower stationary post member 13 being fixedly connected to the ground preferably to a concrete slab "S" by bolting and being provided on its upper end portion with a connecting plate 131 and provided below said connecting plate 131 is a motor housing 132 wherein an electric motor 133 is being disposed therein. The electric motor 133 having a upwardly extending pinion gear 134 adapted to be meshed to a bearing assembly 15 of said upper rotating post member 14. Said bearing assembly 15 comprising of a circular ring 151 adapted to be fixedly attached to said connecting plate 131 preferably by bolting. The circular ring 151 being provided with an annular gear 152 rotatively in communication to the inner circumference of said circular ring 151. The annular gear 152 being meshed to said pinion gear 134 and adapted to be fixedly attached to an upper connecting plate 141 of said upper rotating post member 14 preferably by bolting. The upper connecting plate 141 being provided on its lower side portion with an extension shaft 142 with a rotating disc 143 on its free end which extends within said lower stationary post member 13 and meshed to a central bore 144 of an auxiliary supporting plate 16 fixedly attached to the inner side portion of the lower cylindrical post. The upper connecting plate 141 is adapted to support the cylindrical upper post member 14.

Said motor rotates said pinion gear and transfer its rotation to said annular gear to which the upper rotating post member wherein the billboard frame 11 is fixedly attached, thus it also rotates.

This structure can withstand typhoon and gusty winds even with the tarpaulin on. The lighting facility secured inside the billboard frame providing bright illumination evenly diffused on both faces of the tarpaulin ad material.

Said bearing assembly is disposed at the end of the external portion of the upper cylinder allowing ease in the rotation and prevent the motor from being over-loaded or over worked. The efficiency of bearing function and the accuracy in the calculation to determine the fulcrum point center where weight is balance from all sides of the moving cylinder should lessen the friction that will allow ease in rotation and save on electricity and prevent motor from being over-worked or over-loaded.

The foregoing description is provided for illustrative purposes only and should not be construed as in any way limiting this utility model, the scope of which is defined solely by the appended claims.

The invention claimed is:

1. An Automated Rotating Billboard comprising a billboard frame having lighting facility consisting of plurality of lighting fixtures secured thereto and being provided with a covering for securing advertisement thereon, said frame being supported by an upstanding post fixedly attached on its bottom portion thereof; characterized in that said upstanding post comprising of a lower stationary post member and upper rotating post member, said lower stationary post member being fixedly connected to the ground preferably to a concrete slab by bolting and being provided on its upper end portion with a connecting plate, provided below said connecting plate is a motor housing wherein an electric motor is being disposed therein, said electric motor having a upwardly extending pinion gear adapted to be meshed to a bearing assembly of said upper rotating post member; said bearing assembly comprising of a circular ring adapted to be fixedly attached to said connecting plate preferably by bolting, said circular ring being provided with an annular gear rotatively in communication to the inner circumference of said circular ring, said annular gear being meshed to said pinion gear and adapted to be fixedly attached to an upper connecting plate of said upper rotating post member preferably by bolting; said upper connecting plate being provided on its lower side portion with an extension shaft with a rotating disc on its free end which extends within said lower stationary post member and meshed to a central bore of an auxiliary supporting plate fixedly attached thereon; said upper connecting plate adapted to support the cylindrical upper post member.

* * * * *